(12) United States Patent
Ellis

(10) Patent No.: US 6,954,990 B2
(45) Date of Patent: Oct. 18, 2005

(54) ANGLE MEASURING DEVICE

(76) Inventor: Merle R. Ellis, 5575 US 220 N. #12, Summerfield, NC (US) 27358

( * ) Notice: Subject to any disclaimer, the term of this patent is extended or adjusted under 35 U.S.C. 154(b) by 0 days.

(21) Appl. No.: 10/960,033

(22) Filed: Oct. 7, 2004

(65) Prior Publication Data

US 2005/0081394 A1 Apr. 21, 2005

Related U.S. Application Data

(63) Continuation of application No. 10/427,002, filed on May 1, 2003, now abandoned.

(51) Int. Cl.$^7$ ................................................ B43L 7/10
(52) U.S. Cl. ................................................. 33/471; 33/424
(58) Field of Search .......................... 33/424, 451, 452, 33/465, 471, 497, 499, 500, 483, 484, 485, 492

(56) References Cited

U.S. PATENT DOCUMENTS

| | | | |
|---|---|---|---|
| 185,977 A | 1/1877 | Smith .......................... 206/214 |
| 233,203 A | 10/1880 | Cushman ..................... 220/212 |
| 409,934 A | 8/1889 | Delmage ...................... 33/465 |
| 469,593 A | 2/1892 | Patterson ..................... 206/214 |
| 538,051 A | 4/1895 | Taylor ......................... 33/418 |
| 562,486 A | 6/1896 | Lita ............................ 33/485 |
| 642,498 A | 1/1900 | Smith .......................... 30/123 |
| 650,436 A | 5/1900 | Townsend et al. ............ 33/420 |
| 875,243 A | * 12/1907 | Cramer ........................ 33/352 |
| 875,462 A | * 12/1907 | Rowan ......................... 33/341 |
| 912,605 A | 2/1909 | Osmonson .................... 33/456 |
| 936,157 A | 10/1909 | Phenix ......................... 33/471 |
| 942,583 A | 12/1909 | Neeld ........................... 403/111 |
| 946,472 A | 1/1910 | Stauffer ....................... 33/343 |
| 1,006,815 A | 10/1911 | Wiegman ..................... 33/421 |
| 1,007,269 A | 10/1911 | Clarke ......................... 33/451 |
| 1,014,402 A | 1/1912 | Larsen ......................... 33/383 |
| 1,046,362 A | 12/1912 | Adams ......................... 33/460 |
| 1,059,264 A | 4/1913 | Berggren ...................... 33/424 |
| 1,083,376 A | * 1/1914 | Robinson ..................... 33/451 |
| 1,119,450 A | * 12/1914 | Parr ............................. 33/451 |
| 1,329,005 A | 1/1920 | Neumaier ..................... 33/465 |
| 1,440,284 A | 12/1922 | Engstrom ..................... 33/471 |
| 1,454,693 A | * 5/1923 | Schlattau ...................... 33/290 |
| 1,585,563 A | 5/1926 | Schlattau ...................... 33/471 |
| 1,673,577 A | 6/1928 | McGee ........................ 403/93 |
| 1,725,263 A | * 8/1929 | Fleishman ..................... 33/473 |
| 1,908,518 A | 5/1933 | Lee .............................. 33/451 |
| 2,247,327 A | 6/1941 | Brady .......................... 33/451 |
| 2,719,548 A | 10/1955 | Mitchell ....................... 83/486.1 |
| 2,741,030 A | 4/1956 | Wise ............................ 33/340 |
| 2,878,569 A | 3/1959 | Metrulis ....................... 33/451 |
| 3,153,859 A | 10/1964 | Jones ........................... 33/419 |
| 3,522,657 A | 8/1970 | Metrulis ....................... 33/342 |
| 4,481,720 A | 11/1984 | Sury ............................ 33/451 |
| 4,569,438 A | * 2/1986 | Sheffler ........................ 206/37 |
| 4,611,407 A | 9/1986 | van Gorp ..................... 33/471 |
| 5,388,340 A | 2/1995 | Marty .......................... 33/421 |
| 5,475,931 A | * 12/1995 | Wei ............................. 33/471 |
| 6,209,213 B1 | 4/2001 | Moe ............................ 33/471 |
| 6,314,652 B1 | 11/2001 | English ........................ 33/421 |
| 6,330,752 B1 | 12/2001 | Ellam .......................... 33/471 |
| D493,734 S | 8/2004 | Ellis | |

FOREIGN PATENT DOCUMENTS

| | | | |
|---|---|---|---|
| CH | 322307 | 7/1957 | |
| WO | WO 02/09952 A1 | 2/2002 | ............. B43L/7/10 |

OTHER PUBLICATIONS

Copy of Instructional Pamphlet for BOSCH, Digital Angle Measuring Device, Undated, 5 pages.
Three (3) pictures of a tool with the imprint—Pacific Arc, 3010 TG, Korea; pictures are marked P1, P2 and P3 and reflect open and closed postures.

* cited by examiner

*Primary Examiner*—Christopher W. Fulton
*Assistant Examiner*—Amy R. Cohen

(57) ABSTRACT

A measuring device is provided for carpenters, roofers and other tradesmen. The device is made of relatively lightweight plastic and has a variety of uses. The elongated base is rectangular in cross sectional and includes a scale for measuring distances along one side. Pivotally affixed to the base is a level which can be locked against a protractor (also affixed to the base) at any angle between zero and ninety degrees (0°–90°). Roof pitches, gradients and other angles can be determined or set in a simple, easy to learn manner.

19 Claims, 5 Drawing Sheets

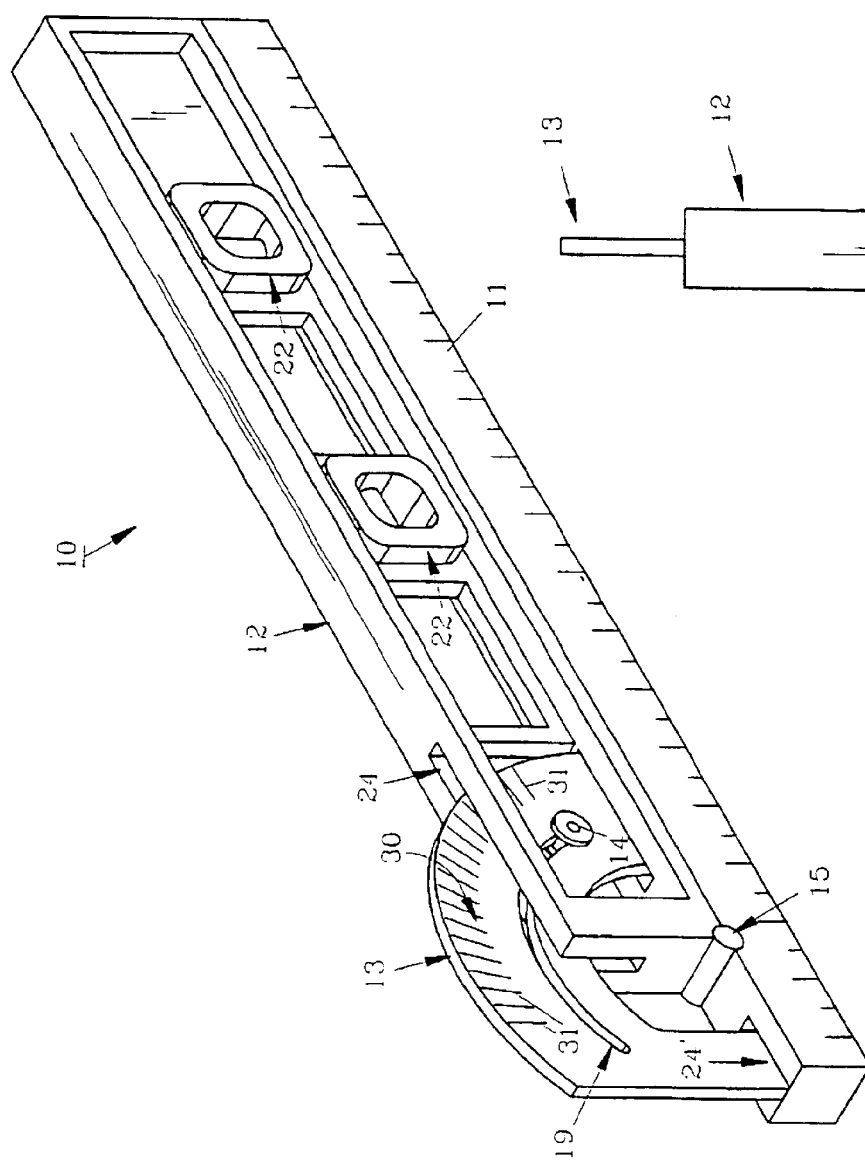
FIG. 2
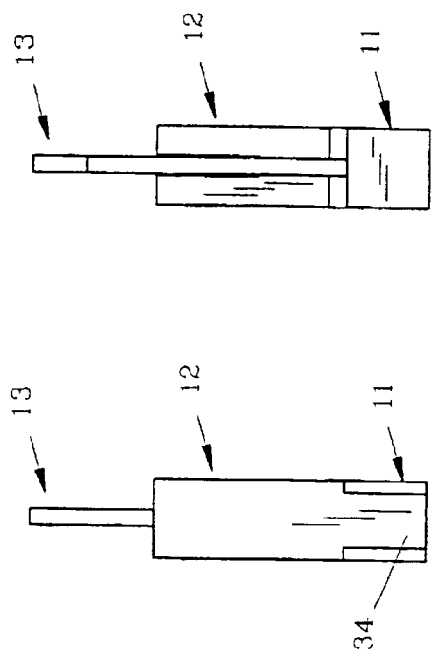
FIG. 5
FIG. 6

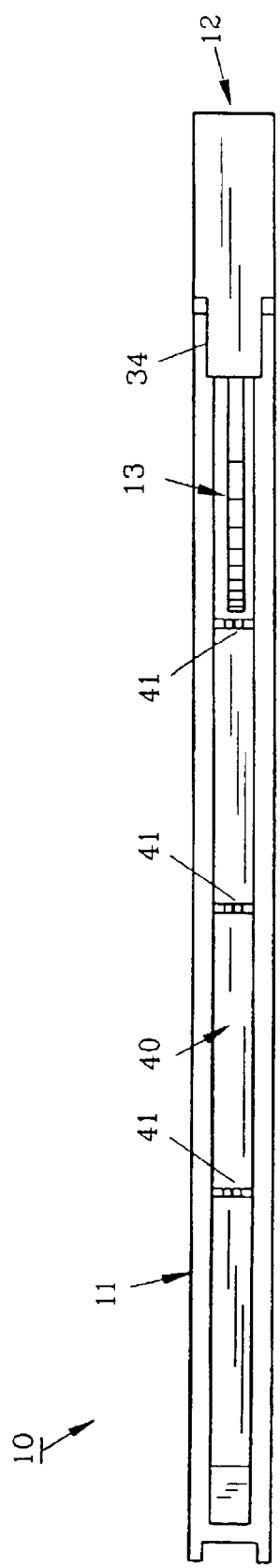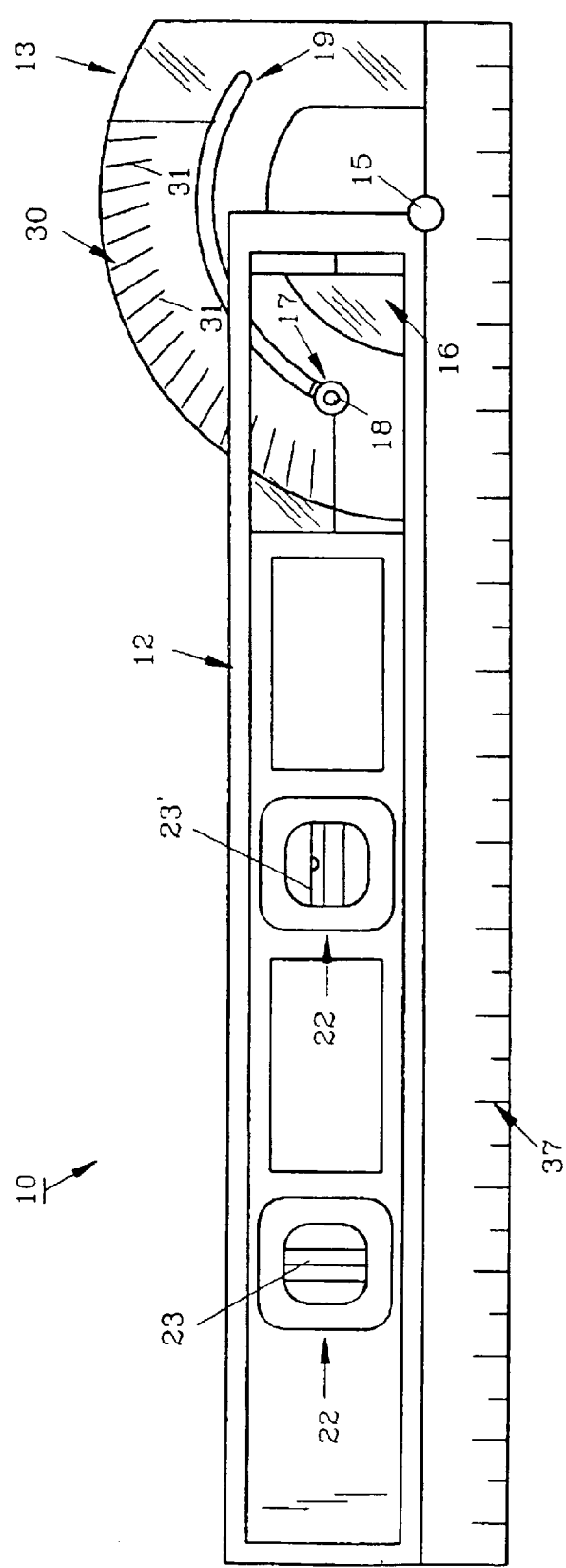
FIG. 9
FIG. 3

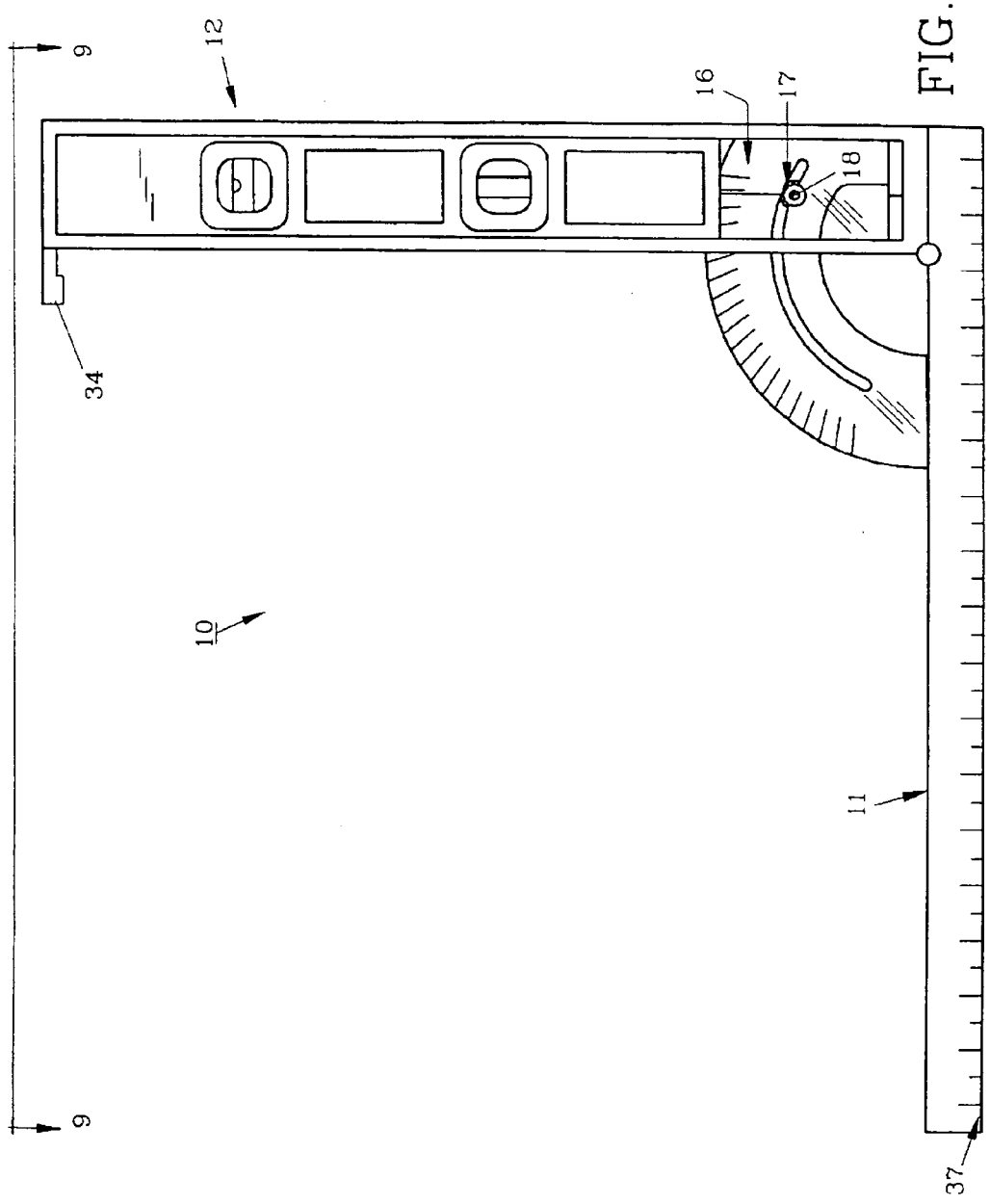

ANGLE MEASURING DEVICE

This is a continuation of application Ser. No. 10/427,002 filed May 01, 2003, now abandoned.

FIELD OF THE INVENTION

The invention herein pertains to a measuring device for use by carpenters and other tradesmen for measuring and setting angles and pitches.

DESCRIPTION OF THE PRIOR ART AND OBJECTIVES OF THE INVENTION

Tools and devices in recent years have greatly increased in complexity and price. Tools which have multiple purposes are becoming increasingly popular since a tradesman can more easily purchase and transport a single tool instead of two or three tools each having a single purpose. However, many multipurpose tools available today are bulky and inconvenient to handle. Some multipurpose tools provide several particular uses, but certain of these uses are very rarely needed, making them relatively expensive and providing little convenience. Thus, in view of the problems and disadvantages of conventional multipurpose measuring devices and tools, the present invention was conceived and one of its objectives is to provide a measuring device which is compact and will fulfill a variety of measuring requirements for a carpenter or other tradesmen.

It is still another objective of the present invention to provide a multipurpose measuring device which allows the user accuracy and flexibility in measuring angles and linear measurements.

It is yet another objective of the present invention to provide a manual measuring device which includes a level in combination with a protractor to measure or set pitches, gradients and the like.

It is still another objective of the present invention to provide a measuring device which will act as a square for ninety degree (90°) measurements or markings.

It is also another objective of the present invention to provide a measuring device which can be accurately pivoted and locked at any angle between zero and ninety degrees (0°–90°).

Various other objectives and advantages of the present invention will become apparent to those skilled in the art as a more detailed description is set forth below.

SUMMARY OF THE INVENTION

The invention herein pertains to a measuring device, namely a multipurpose hand tool having a base pivotally affixed to a level. The level includes a rearward slot, proximate its pivot point for containing a protractor whereby the level and base can be pivotally adjusted accurately to any variety of degrees from zero to ninety (0–90) and locked thereat. When the level is pivoted to a ninety degree (90°) angle, the measuring device can be used as a carpenter's square or for other purposes. Uses of the measuring device also include, but are not limited to measuring the pitch of a roof, the grade of a road bed or other surfaces. In addition, a ruler along one side of the base allows the user to take measurements as needed. The preferred length of the base of the measuring device is 15 and 31/32 inches, thus allowing the tool to be used in setting wall or deck studs on 16 inch centers by providing approximately 1/32 inch in width for applying a pencil mark.

In the measurement of a particular angle, the level is pivoted from the base, the angle is selected and a threaded locking member allows the base and level to be quickly locked in place. A scale on the protractor permits the desired angle to be measured. When closed, a locking tab on the front of the level engages a catch on the base to maintain the measuring device securely closed. Upon opening or pivoting the level, a storage compartment in the base is exposed for containing pencils or other small items for convenient storage.

BRIEF DESCRIPTION OF THE DRAWINGS

FIG. 2 illustrates the right side of the measuring device as shown in FIG. 1 with the level closed onto the base;

FIG. 3 demonstrates a left side view of the measuring device in a closed posture;

FIG. 4 features the measuring device in diminished form open ninety degrees (90°);

FIG. 5 pictures a front end view of the measuring device closed with the tab affixed on the catch;

FIG. 6 shows a rear elevational view of the measuring device as shown in FIG. 5;

FIG. 9 demonstrates a top view of the base as seen along lines 9—9 of FIG. 4.

DETAILED DESCRIPTION OF THE PREFERRED EMBODIMENT AND OPERATION OF THE INVENTION

Figure 1:
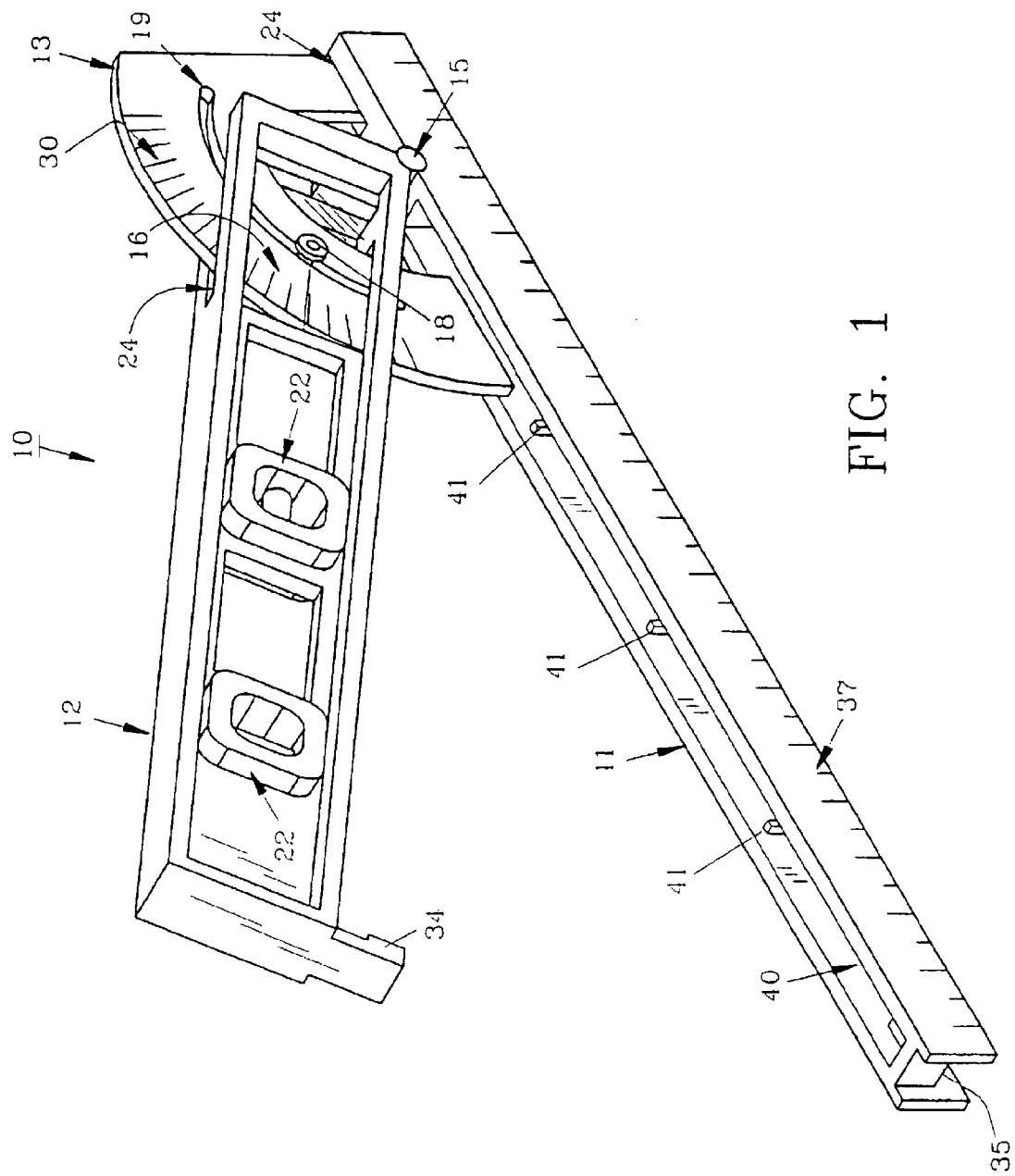
FIG. 1 shows a left side perspective view of the measuring device of the invention with the level open approximately 45° from the base.
Figure 7:
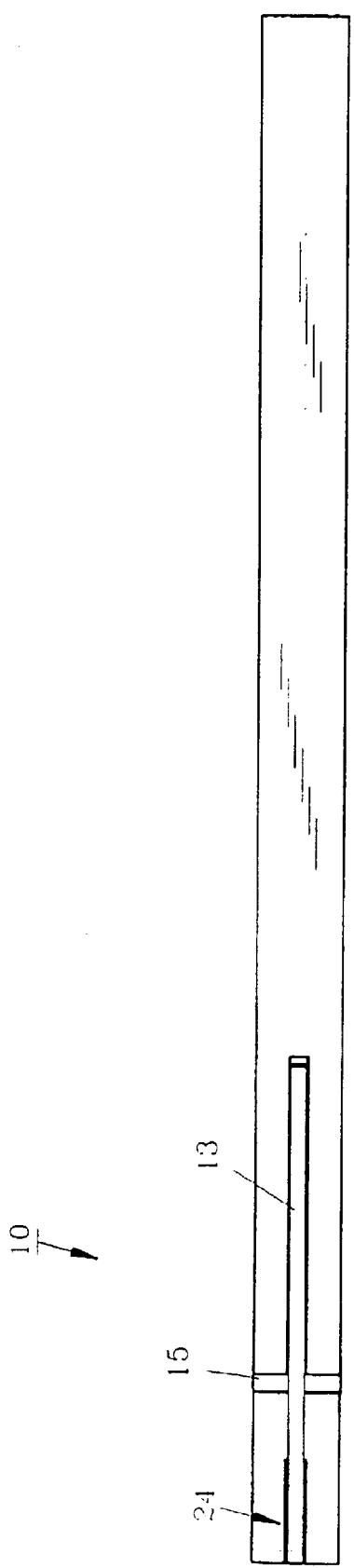
FIG. 7 illustrates a top plan view of the measuring device as seen in FIG. 2.
Figure 8:
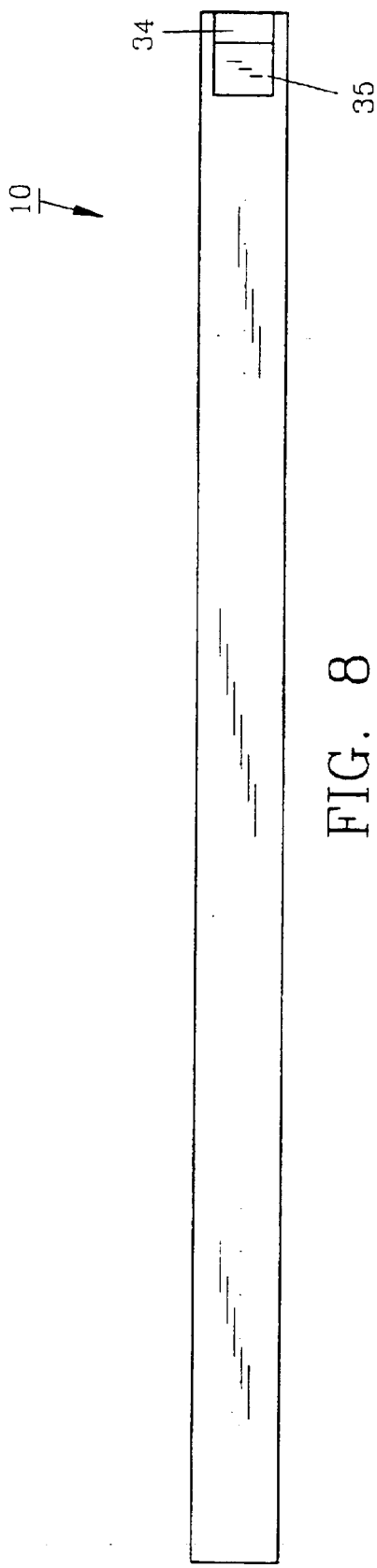
FIG. 8 depicts a bottom plan view of the measuring device as shown in FIG. 7.

For a better understanding of the invention and its operation, turning now to the drawings, FIG. 1 demonstrates preferred measuring device 10 seen in perspective fashion having base 11, level 12 and protractor 13. As shown in FIGS. 1, 2, and 7, slots 24, 24' are defined in base 11 and level 12 to accommodate protractor 13. Protractor 13 is rigidly mounted within base 11 such as by frictionally fitting therein or with conventional glues or adhesives. Level 12 is also mounted to base 11 by hinge 15. Window 16 within level 12 is preferably formed from a transparent rigid plastic material such as a clear polycarbonate or polyacrylate and is affixed to level 12 as seen in FIGS. 1, 3, and 4. Window 16 includes aperture 17 through which threaded locking member 18 is positioned. Locking member 18 passes through window aperture 17 of window 16 and slot 19 of protractor 13 whereby, effectively bolt nut 14, as seen in FIG. 2, is used to tighten threaded member 18 in place. Locking member 18 can be manually tightened to lock level 12 in any number of positions along scale 30 having line gradients 31, relative to base 11.

Level 12 as shown in FIGS. 1 and 2, contains two (2) level elements 22. Level elements 22 are conventional, rectangular and enclose level tubes 23 which are filled with a liquid having a movable air bubble for level measuring purposes as is standard. In FIG. 3, one level element 22 provides vertical level tube 23 and the other level element 22 provides a horizontal level tube 23' as with conventional levels. Thus by pivoting level 12 relative to base 11 through hinge 15 and with use of protractor 13, level 12 can be used as an angle or gradient finder to locate the pitch of a roof, or as a square with level 12 perpendicularly aligned to base 11 as seen in FIG. 4. Hence, measuring tool 10 can be used by carpenters, roofers, masons and other tradesmen for a variety of needs.

As would be understood, level 12 can be locked to any desired pitch or gradient by manually tightening locking member 18. Similarly, by using scale 30 on protractor 13 any such pitch, gradient or the like can be relatively determined.

When used in a closed fashion as shown in FIG. 3, measuring device 10 can be used like a ruler for spacing wall or other studs on centers during construction phases. As shown in FIG. 3, measuring tool 10 has a base with indicia 37 printed or molded thereon in the form of a conventional ruler. Base 11 in the preferred embodiment is exactly 15 and 31/32 inches in length for marking the position of building studs set on 16 inch centers. The 1/32 inch difference being allowed for a pencil mark on the wood or building material used.

To open measuring device 10 for measuring angles or the like, tab 34 as shown in FIGS. 1 and 4 is pressed or flexed outwardly by a thumb or finger in the longitudinal direction of base 11 to thereby free locking tab 34 from catch 35 on base 11 as shown in FIG. 1.

As further shown in FIGS. 1 and 9, storage compartment 40 is contained in base 11 and is sized to accommodate pencils or other small items. Storage compartment 40 includes pencil brackets 41 which will engage the shaft of a conventional wooden pencil to secure it in place for convenient access.

The illustrations and examples provided herein are for explanatory purposes and are not intended to limit the scope of the appended claims.

I claim:

1. A device for measuring angles comprising: an elongated base, said base comprising a first end and a second end, said base defining a storage compartment, an elongated level, said level having a first end and a second end, a flexible tab, said tab affixed to said first end of said level, a catch, said catch positioned on said base first end, said catch for engaging said tab, said level second end pivotally joined to said base, said level shorter than said base, said level closing said storage compartment when pivoted against said base, a protractor, said protractor affixed to said base, said level pivotable along said protractor, a hinge, said hinge joined to said level second end, said protractor straddling said hinge, said hinge positioned on said base to allow said level second end to rest on said base and to form a right angle therewith when said level is fully open and said flexible tab engaging said catch when said level is closed in parallel to said base.

2. The device of claim 1 further comprising a bracket, said bracket positioned in said storage compartment.

3. The device of claim 1 further comprising a plurality of brackets, said brackets positioned in said storage compartment, each of said brackets spaced from another.

4. The device of claim 1 wherein said level defines an opening, a window, said window attached to said level within said opening, said window defining an aperture, a locking member, said locking member contained in said window aperture, said window contiguous to said protractor, said protractor defining a slot, said protractor slot aligned with said window aperture, said locking member contained in said protractor slot, said locking member selectively affixing said protractor to said window for securing said level at a desired angle to said base.

5. The device of claim 4 wherein said locking member comprises a threaded member and a nut, said nut received on said threaded member, said nut engaging said protractor whereby tightening said nut on said threaded member restricts the movement of said level.

6. The device in claim 4 wherein said protractor comprises a scale, said window comprising an indicator line, said indicator line perpendicular to said level ends, said indicator line bisecting said window aperture, said indicator line overlapping said scale whereby said indicator line suggests where to read said scale for measuring the angle between said level and said base.

7. The device of claim 1 wherein said flexible tab depends normally from same level first end.

8. The device of claim 7 wherein said tab is flush with said base first end when said tab is engaged with said catch.

9. The device of claim 1 wherein said level further defines a slot at said level second end, said protractor contained in said level slot.

10. The device of claim 1 wherein said base further comprises a rectangular member having a top, a bottom, a front, a back, and said base ends, said top defining said storage compartment between said base ends, said hinge positioned on said base top, said hinge spaced from said base second end.

11. The device of claim 10 wherein said level further comprises a rectangular member having a top, a bottom, a front, a back, and said level ends, said level first end coplanar with said base first end when said level closed against said base, said level second end parallel with said base top when said level fully open, said level top coplanar with said base second end when said level fully open.

12. The device of claim 1 wherein said level further comprises a rectangular member having a top, a bottom, a front, a back, and said level ends, said hinge positioned on said level at the intersection of said level second end and said level bottom.

13. The device of claim 1 wherein said level further defines a first level opening, a first level element, said first level element contained within said first level opening, a first level tube, said first level tube contained within said first level element.

14. The device of claim 13 wherein said level further defines a second level opening, a second level element, said second level element contained within said second level opening, a second level tube, said second level tube contained within said second level element.

15. A device for measuring angles comprising: an elongated base, said base comprising a first end and a second end, said base defining a storage compartment, an elongated level, said level having a first end and a second end, said level second end pivotally joined to said base, said level shorter than said base, said level closing said storage compartment when pivoted against said base, a protractor, said protractor affixed to said base, said level pivotable along said protractor, a hinge, said hinge joined to said level second end, said protractor straddling said hinge, said hinge positioned on said base to allow said level second end to rest on said base when said level is fully open, said level defining an opening, a window, said window attached to said level within said opening, said window defining an aperture, a locking member, said locking member contained in said window aperture, said window contiguous to said protractor, said protractor defining a slot, said protractor slot aligned with said window aperture, said locking member contained in said protractor slot, said locking member selectively affixing said protractor to said window, a bracket, said bracket positioned in said storage compartment, a flexible tab, said tab depending from said level first end, said base defining a catch, said catch positioned on said base first end, said tab releasably engageable with said catch when said level is pivoted to a closed posture against said base.

16. The device of claim 15 wherein said level further defines a slot at said level second end, said protractor contained in said level slot, said window contiguous said level slot whereby said protractor is visible through said window.

17. A device for measuring angles comprising: an elongated base, said base comprising a first end and a second end, said base defining a storage compartment, an elongated level, said level having a first end and a second end, said level second end pivotally joined to said base, said level shorter than said base, said level closing said storage compartment when pivoted against said base, a protractor, said protractor affixed to said base, said level further defines a slot at said level second end, said protractor contained in said level slot, said level pivotable along said protractor, a hinge, said hinge joined to said level second end, said protractor straddling said hinge, said hinge positioned on said base to allow said level second end to rest on said base when said level is fully open, said level defining an opening, a window, said window attached to said level within said opening, said window defining an aperture, a locking member, said locking member contained in said window aperture, said window contiguous to said protractor, said protractor visible through said window, said protractor defining a slot, said protractor slot aligned with said window aperture, said locking member contained in said protractor slot, said locking member selectively affixing said protractor to said window, a flexible tab, said tab depending from said level first end, said base defining a catch, said catch positioned on said base first end, said tab releasably engageable with said catch when said level is pivoted to a closed posture against said base, a first bracket, said first bracket positioned in said storage compartment.

18. The device of claim 17 further comprising a second bracket, said second bracket positioned in said storage compartment spaced from said first bracket.

19. The device in claim 17 wherein said protractor comprises a scale, said window comprising an indicator line, said indicator line perpendicular to said level ends, said indicator line bisecting said window aperture, said indicator line overlapping said scale whereby said indicator line suggests where to read said scale for measuring the angle between said level and said base.

* * * * *